US006275824B1

United States Patent
O'Flaherty et al.

(10) Patent No.: US 6,275,824 B1
(45) Date of Patent: Aug. 14, 2001

(54) SYSTEM AND METHOD FOR MANAGING DATA PRIVACY IN A DATABASE MANAGEMENT SYSTEM

(75) Inventors: Kenneth W. O'Flaherty, San Diego; Richard G. Stellwagen, Jr.; Todd A. Walter, both of Poway, all of CA (US); Reid M. Watts; David A. Ramsey, both of Lexington, SC (US); Adriaan W. Veldhuisen, San Marcos; Renda K. Ozden, San Diego, both of CA (US); Patric B. Dempster, Atlantic Highlands, NJ (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/165,777

(22) Filed: Oct. 2, 1998

(51) Int. Cl.[7] ................................................ G06F 17/30

(52) U.S. Cl. .................... 707/9; 707/2; 707/3; 707/10; 707/102; 713/200

(58) Field of Search .................................. 707/9, 10, 104, 707/2–4; 705/35–37; 713/200–202

(56) References Cited

U.S. PATENT DOCUMENTS

| 5,319,777 | * | 6/1994 | Perez ........................................ 707/1 |
| 5,751,949 |   | 5/1998 | Thomson et al. .  |
| 5,961,593 | * | 10/1999 | Gabber et al. ........................ 709/219 |
| 6,085,191 | * | 7/2000 | Fisher et al. .............................. 707/9 |
| 6,141,658 | * | 10/2000 | Mehr et al. ................................ 707/7 |
| 6,195,657 | * | 2/2001 | Rucker et al. ............................ 707/5 |

FOREIGN PATENT DOCUMENTS

WO 95/22792    8/1995  (WO).

OTHER PUBLICATIONS

"A Prototype Model for Data Warehouse Security Based on Metadata," Katic et al., Proceedings of the 1998 IEEE International Workshop on Database and Expert Systems Applications, Aug. 26–28, 1998, pp. 300–308.*
President William J. Clinton, Vice President Albert Gore Jr., "A Framework For Global Electronic Commerce," Jul. 1997, at http://www.iitf.nist.gov/eleccomm/ecomm.htm, pp. 1–22.
Markoff, John, "U.S. and Europe Clash Over Internet Consumer Privacy," Jul. 1, 1998 at http://search.nytimes.com/search/daily/b. . . astweb?getdoc+site+site+35855+0+wAAA+P, pp.1–3.
"OECD Guidelines on the Protection of Privacy and Transborder Flows of Personal Data," Oct. 1, 1997 at http://www.oecd.org/dsti/sti/it/secur/prod/PRIV-EN.HTM, pp. 1–23.
"FTC Releases Report on Consumer' Online Privacy", Report to Congress on Privacy Online, Jun. 4, 1998, at http://www.ftc.gov/opa/9806/privacy2.htm, pp. 1–4.

(List continued on next page.)

Primary Examiner—Hosain T. Alam
(74) Attorney, Agent, or Firm—Gates & Cooper

(57) ABSTRACT

A method, apparatus, and article of manufacture for managing data privacy in a database management system is disclosed. The apparatus comprises a database management system, for storing and retrieving data from a plurality of database tables wherein the data in the database tables is controllably accessible according to privacy parameters stored in the database table, a database management system interface operatively coupled to the database management system and controlling access to the data within the database tables according to the privacy parameters, and an audit module, communicatively coupled to the database management system interface, for validating enforcement of the data privacy parameters in the database management system.

11 Claims, 12 Drawing Sheets

OTHER PUBLICATIONS

"High Tech Industry Leaders Announce Self–Regulatory Plan to Ensure Online Privacy," Online Privacy Alliance Letter to President William J. Clinton, Jun. 3, 1998 (8 pages).

"Privacy and the National Information Infrastructure: Principles for Providing and Using Personal Information," Privacy Working Group, Information Policy Committee, Information Infrastructure Task Force, Jun. 6, 1995, at http://www.iitf.nist.gov/ipcipc/ipc–pubs/niiprivprin_final.htm, pp. 1–10.

"Directive 95/46/EC of the European Parliament and of the Council," Oct. 24, 1995, Official Journal of the European Communities, Page Nos. L281/31–L281/50.

"Directive 97/66/EC of the European Parliament and of the Council," Dec. 15, 1997, Official Journal of the European Communities, Jan. 30, 1998, Page Nos. L24/1–L24/8.

Sushil Jajodia et al: "Toward a Multilevel Secure Relational Data Model" Sigmond Record, US, Association For Computing Machinery, New York, vol, 20, No. 2, Jun. 1991 (Jun. 1991), p. 50–59 XP000364619.

FinnePT.: "What Are the Information Security Risks in Decision Support Systems and Data Warehousing?" Computers & Security. International Journal Devoted to the Study of Technical and Financial Aspects of Computer Security., vol. 16, 1997, pp. 197–204, XP002127079 Elsevier Science Publishers, Amsterdam., NL ISSN: 0167–4048.

* cited by examiner

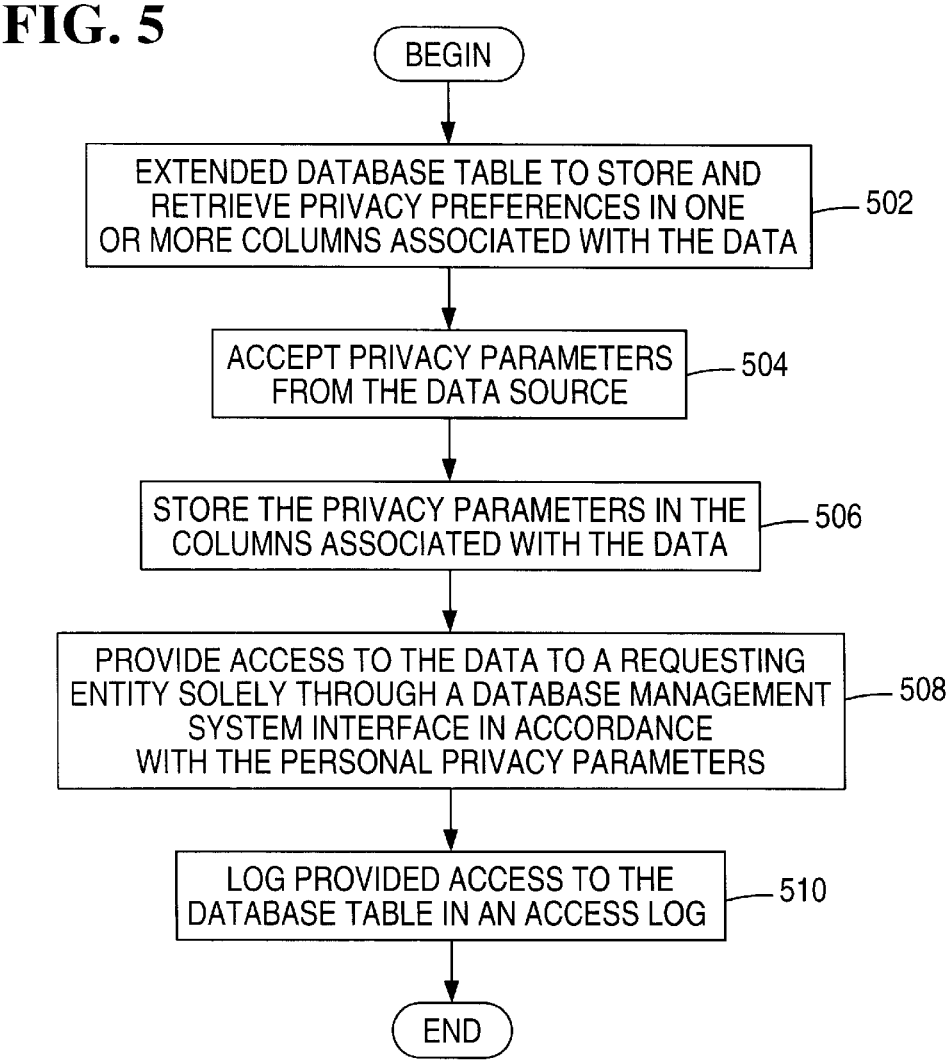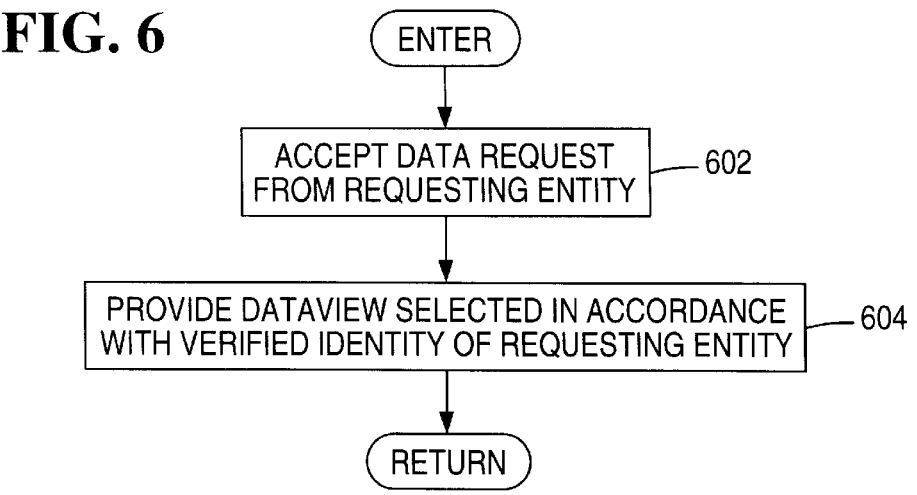

SYSTEM AND METHOD FOR MANAGING DATA PRIVACY IN A DATABASE MANAGEMENT SYSTEM

CROSS-REFERENCE TO RELATED APPLICATIONS

This application is related to the following co-pending and commonly assigned applications, each of which is hereby incorporated by reference herein:

U.S. Provisional Patent Application Ser. No. 60/102,832, entitled "SYSTEM AND METHOD FOR PRIVACY-ENHANCED DATA WAREHOUSING," by Kenneth W. O'Flaherty, Reid M. Watts, David A. Ramsey, Adriaan W. Veldhuisen, Richard G. Stellwagen, Jr., Todd A. Walter, and Patric B. Dempster, filed on same date herewith;

Application Ser. No. 09/165,784, entitled "PRIVACY-ENHANCED DATABASE," by Kenneth W. O'Flaherty, Reid M. Watts, and David A. Ramsey, Adriaan W. Veldhuisen, Richard G. Stellwagen, Jr., and Todd A. Walter, filed on same date herewith; and Application Ser. No. 09/165,457, entitled "PRIVACY-ENABLED LOYALTY CARD SYSTEM AND METHOD," by Kenneth W. O'Flaherty, Reid M. Watts, and David A. Ramsey, filed on same date herewith.

BACKGROUND OF THE INVENTION

1. Field of the Invention

The present invention relates to systems and methods of data warehousing and analysis, and in particular to a system and method for enforcing privacy constraints on a database management system.

2. Description of the Related Art

Database management systems are used to collect, store, disseminate, and analyze data. These large-scale integrated database management systems provide an efficient, consistent, and secure data warehousing capability for storing, retrieving, and analyzing vast amounts of data. This ability to collect, analyze, and manage massive amounts of information has become a virtual necessity in business today.

The information stored by these data warehouses can come from a variety of sources. One important data warehousing application involves the collection and analysis of information collected in the course of commercial transactions between businesses and consumers. For example, when an individual uses a credit card to purchase an item at a retail store, the identity of the customer, the item purchased, the purchase amount and other related information are collected. Traditionally, this information is used by the retailer to determine if the transaction should be completed, and to control product inventory. Such data can also be used to determine temporal and geographical purchasing trends.

Similar uses of personal data occur in other industries. For example, in banking, the buying patterns of consumers can be divined by analyzing their credit card transaction profile or their checking/savings account activity, and consumers with certain profiles can be identified as potential customers for new services, such as mortgages or individual retirement accounts. Further, in the telecommunications industry, consumer telephone calling patterns can be analyzed from call-detail records, and individuals with certain profiles can be identified for selling additional services, such as a second phone line or call waiting.

Additionally, data warehouse owners typically purchase data from third parties, to enrich transactional data. This enrichment process adds demographic data such as household membership, income, employer, and other personal data.

The data collected during such transactions is also useful in other applications. For example, information regarding a particular transaction can be correlated to personal information about the consumer (age, occupation, residential area, income, etc.) to generate statistical information. In some cases, this personal information can be broadly classified into two groups: information that reveals the identity of the consumer, and information that does not. Information that does not reveal the identity of the consumer is useful because it can be used to generate information about the purchasing proclivities of consumers with similar personal characteristics. Personal information that reveals the identity of the consumer can be used for a more focused and personalized marketing approach in which the purchasing habits of each individual consumer are analyzed to identify candidates for additional or tailored marketing.

Another example of an increase in the collection of personal data is evidenced by the recent proliferation of "membership" or "loyalty" cards. These cards provide the consumer with reduced prices for certain products, but each time the consumer uses the card with the purchase, information about the consumer's buying habits is collected. The same information can be obtained in an on-line environment, or purchases with smart cards, telephone cards, and debit or credit cards.

Unfortunately, while the collection and analysis of such data can be of great public benefit, it can also be the subject of considerable abuse. In the case of loyalty programs, the potential for such abuse can prevent many otherwise cooperative consumers from signing up for membership awards or other programs. It can also discourage the use of emerging technology, such as cash cards, and foster continuation of more conservative payment methods such as cash and checks. In fact, public concern over privacy is believed to be a factor holding back the anticipated explosive growth in web commerce.

For all of these reasons, as well as regulatory constrains, when personal information is stored in data warehouses, it is incumbent on those that control this data to protect the data from such abuse. As more and more data is collected in this, the computer age, the rights of individuals regarding the use of data pertaining to them have become of greater importance. What is needed is a system and method which provides all the advantages of a complete data warehousing system, while addressing the privacy concerns of the consumer.

SUMMARY OF THE INVENTION

To address the requirements described above, the present invention discloses a method, apparatus, article of manufacture, and a memory structure for managing data privacy in a database management system.

The apparatus comprises a database management system, for storing and retrieving data from a plurality of database tables wherein the data in the database tables is controllably accessible according to privacy parameters stored in the database table, a database management system interface operatively coupled to the database management system and controlling access to the data within the database tables according to the privacy parameters, and an audit module, communicatively coupled to the database management system interface, for validating enforcement of the data privacy parameters in the database management system.

The method comprises the steps of extending a database table to store and retrieve privacy parameters for the data stored in the database table, the privacy parameters collectively stored in a plurality of database columns associated with the data, accepting privacy parameters from the data source, storing the privacy parameters in the columns associated with the data, providing access to the data in the database table to a requesting entity solely through a database management system interface in accordance with the personal privacy parameters, and logging the provided access to the database table in an access log. The program storage device comprises a medium for storing instructions performing the method steps outlined above.

One embodiment of the present invention also utilizes a privacy metadata system that administers and records all data, users, and usage of data that is registered as containing privacy elements. This metadata service provides for locating, consolidating, managing, and navigating warehouse metadata. It also allows for setting aside an area from which all system aspects of privacy are registered, administered, and logged in an auditable format.

BRIEF DESCRIPTION OF THE DRAWINGS

Referring now to the drawings in which like reference numbers represent corresponding parts throughout:

FIG. 5 is a flow chart illustrating exemplary operations used to practice one embodiment of the present invention;

FIG. 6 is a flow chart illustrating exemplary operations used to provide access to data through the database management system interface in one embodiment of the present invention;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
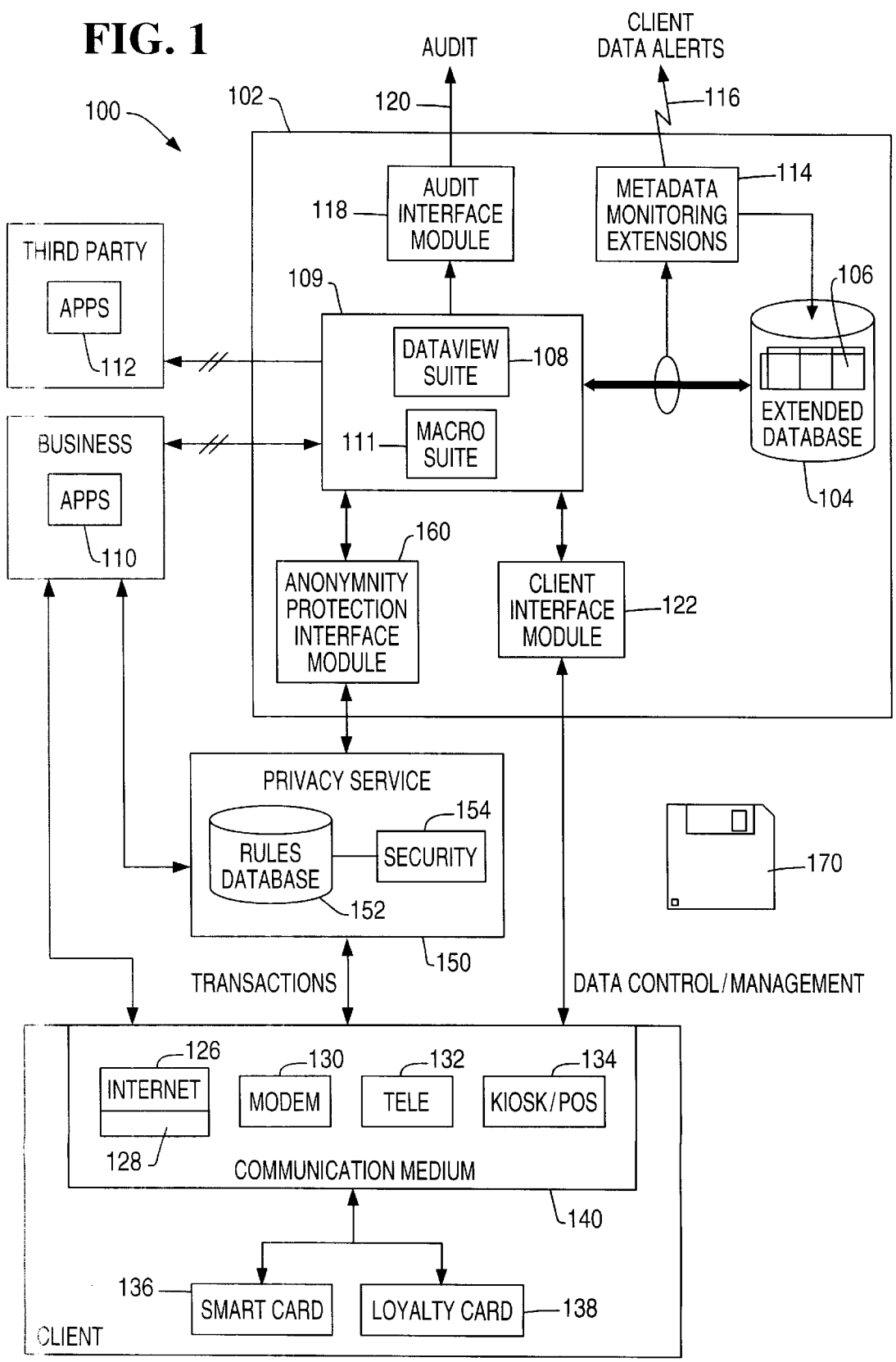
FIG. 1 is a system block diagram of an exemplary embodiment of a data warehousing system.

FIG. 1 is a system block diagram presenting an overview of a data warehousing system 100. The system comprises secure data warehouse 102 having a database management system 104 storing one or more extended databases 106 therein.

One important capability of a database management system is the ability to define a virtual table and save that definition in the database as metadata with a user-defined name. The object formed by this operation is known as a View or a database view (the particular database views used in the present invention are hereinafter referred to as "dataviews"). As a virtual table, a dataview is not physically materialized anywhere in the database until it is needed. All accesses to data, (with the possible exception of data access for administrative purposes) is accomplished through dataviews. To implement a variety of privacy rules, a suite of a plurality of dataviews is provided. Metadata about the privacy dataviews (including the dataview name, names and data types of the dataview columns, and the method by which the rows are to be derived) is stored persistently in the databases metadata, but the actual data presented by the view is not physically stored anywhere in association with the derived table. Instead, the data itself is stored in a persistent base table, and the view's rows are derived from that base table. Although the dataview is a virtual table, operations can be performed against dataviews just as they can be performed against the base tables.

The secure data warehouse 102 further comprises a suite of privacy metadata dataviews 108 through which all data in the extended database 106 are presented. Data within the extended database 106 can be viewed, processed, or altered only through the dataviews in this suite. The schema and logical model of the extended database and dataviews is set forth more fully herein with respect to FIG. 2.

Virtually all access to the data stored in the extended database 106 is provided solely through the dataview suite 108. Thus, business applications 110 and third party applications 112 have access only to such data as permitted by the database view provided. In one embodiment, provision is made to permit override of the customer's privacy preferences. However, in such circumstances, data describing the nature of the override is written to the database for retrieval by the audit module 118, so that the override cannot occur surreptitiously. Further, overrides may be monitored by the privacy metadata monitoring extensions 114 to provide an alert to the consumer when such overrides occur.

The limiting access to the data stored in the extended database 106 to access provided by the privacy dataview suite 108 for purposes of (1) implementing privacy rules provides the capability to make the personal data anonymous (through the anonymizing view described herein), (2) to restrict access to opted-out columns, which can apply to all personal data, separate categories of personal data, or individual data columns, and (3) to exclude entire rows (customer records) for opt-out purposes based on customer opt-outs (excluding a row if any of the applicable opt-out flags has been set for the customer in question, thus preventing any direct marketing or disclosure to third parties).

Using a client interface module 122 that communicates with the dataviews 108, a client 124 can access, control, and manage the data collected from the client 124. This data control and management can be accomplished using a wide variety of communication media 140, including the Internet 126 (via a suitable browser plug-in 128, a modem 130, voice telephone communications 132, or a kiosk 134 or other device at the point of sale. To facilitate such communications, the kiosk or other device at the point of sale, can issue a smartcard 136 or a loyalty card 138. The kiosk/pos device 134 can accept consumer input regarding privacy preferences, and issue a smartcard 136 or loyalty card 138 storing information regarding these preferences. Similarly, the using the kiosk/pos device 134 and the smartcard 136 or loyalty card 138, the consumer may update or change preferences as desired. In cases where the loyalty card 138 is a simple read only device (such as a bar-coded attachment to a key ring), the kiosk/pos device 134 can issue replacement cards with the updated information as necessary. Transactions using the loyalty card 138 or smartcard 136 are selectably encrypted and anonymous. Either card may interact directly with the server or through a plug-in to implement the security rules selected.

Through this interface, the consumer can specify data sharing and retention preferences. These preferences include data retention preferences, and data sharing preferences. These allow the consumer to specify when and under what circumstances personal information may be retained or shared with or sold to others. For example, the consumer may permit such data retention as a part of a loyalty card program, or if the use of the data is limited to particular uses. Further, the consumer may specify under what circumstances the data may be sold outright, used for statistical analysis purposes, or used for third party elective marketing programs.

The data warehousing system 100 also permits anonymous communication between the client and the secure data warehouse 102 via a privacy service 150. When the user desires an anonymous transaction, the transaction is routed to the privacy service 150. The privacy service 150 accesses a privacy rule database 152 and other security information 154 and uses the privacy rule and security information to remove all information from which the identity of the consumer can be determined. The cleansed transaction information is then forwarded to the anonymity protection interface module 160 in the secure data warehouse. Communications with the secure data warehouse 102 use a proxy user identification, which is created by the privacy service 150 from the customer's username or other identifying information. If the customer does not require an anonymous transaction, the transaction is provided directly to the retailer who may store the transaction information in the extended database.

Since it alone provides access to data within the extended database, the dataview suite 108 also provides a convenient and comprehensive means for auditing the security of the secure data warehouse 102.

The secure data warehouse 102 also comprises metadata monitoring extension 114. This extension 114 allows the customer to generate a rule to monitor the use of personal data, and to transmit an alert 116 or callback if a metadata definition change occurs. The consumer can control the metadata monitoring extension 114 to trigger an alert when the customer's personal information is read from the extended database 106, is written to the extended database 106, if the opt-out delimiters stored in the extended database are changed, or when a table or a dataview is accessed. Alternatively, triggered alerts can be logged for later access by the consumer.

The metadata monitoring extension 114 also records data source information, so customers can determine the source of the data stored in the secure data warehouse 102. The data source may be the customer, or may be a third party intermediary source. This feature is particularly useful when the consumer would like to not only correct erroneous information, but to determine the source of the erroneous information so the error will not be replicated in the same database or elsewhere.

Source data may also be stored in the data table for each column or set of columns so that the source of the data can be ascertained directly from table data. In this embodiment, the source identification is generalized so that each customer can have a different source of information without the need to replicate information source information in the metadata for all customers.

Similarly, the metadata monitoring extension 114 also records data target information, so that customers can determine who has been a recipient of their personal information. This feature is also useful for correcting replicated errors, as well as for monitoring disclosure activity relative to a consumer's personal information.

The metadata monitoring extension 114 can also be used to support auditing functions by tracking reads or writes from the extended database 106 as well as the changes to the dataview suite 108.

The present invention can be implemented in a computer comprising a processor and a memory, such as a random access memory (RAM). Such computer is typically operatively coupled to a display, which presents images such as windows to the user on a graphical user interface. The computer may be coupled to other devices, such as a keyboard, a mouse device, a printer, etc. Of course, those skilled in the art will recognize that any combination of the above components, or any number of different components, peripherals, and other devices, may be used with the computer.

Generally, the computer operates under control of an operating system stored in the memory, and interfaces with the user to accept inputs and commands and to present results through a graphical user interface (GUI) module. Although the GUI module is typically a separate module, the instructions performing the GUI functions can be resident or distributed in the operating system, an application program, or implemented with special purpose memory and processors. The computer may also implement a compiler that allows an application program written in a programming language such as COBOL, C++, FORTRAN, or other language to be translated into processor-readable code. After completion, the application accesses and manipulates data stored in the memory of the computer using the relationships and logic that was generated using the compiler.

In one embodiment, instructions implementing the operating system, the computer program, and the compiler are tangibly embodied in a computer-readable medium, e.g., data storage device 170, which could include one or more fixed or removable data storage devices, such as a zip drive, floppy disc drive, hard drive, CD-ROM drive, tape drive, etc. Further, the operating system and the computer program are comprised of instructions which, when read and executed by the computer, causes the computer to perform the steps necessary to implement and/or use the present invention. Computer program and/or operating instructions may also be tangibly embodied in memory and/or data communications devices, thereby making a computer program product or article of manufacture according to the invention. As such, the terms "program storage device," "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Logical Model

Figure 2A:
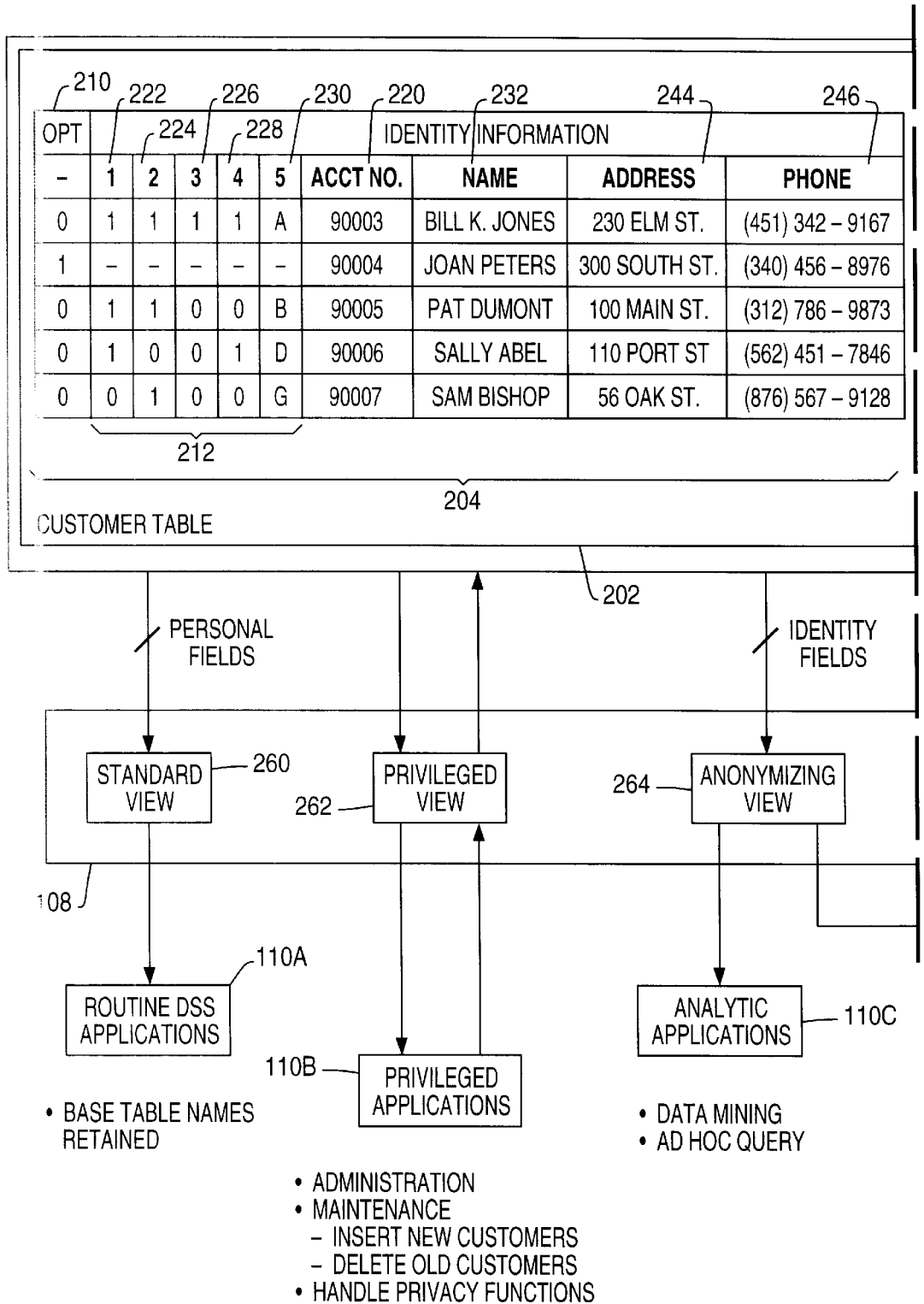
FIG. 2 is a block diagram presenting an illustrative example of the structure of customer tables stored in the privacy-extended customer tables and the database views.
Figure 2B:
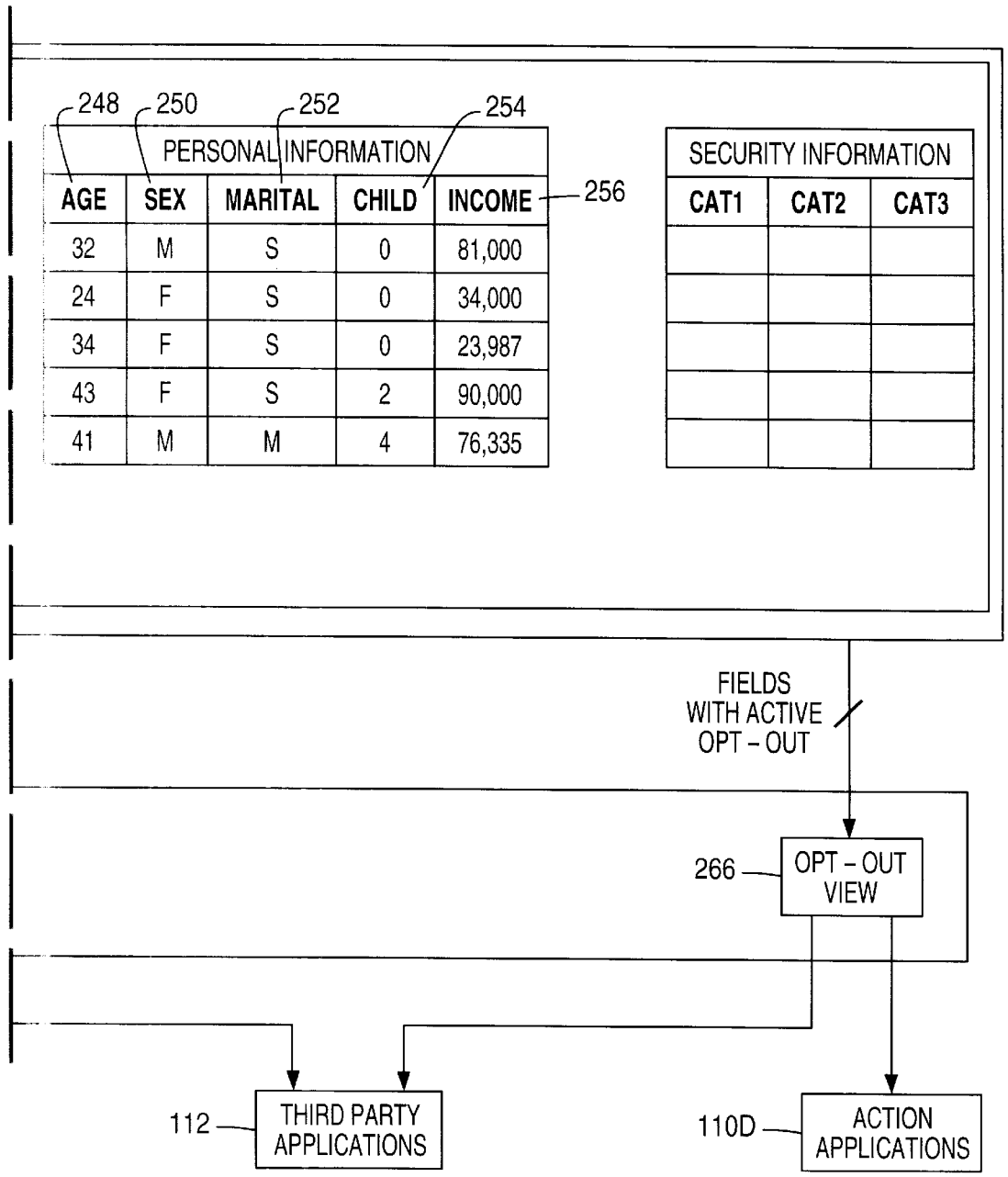

FIG. 2 is a diagram showing an exemplary logical model of the secure data warehouse 102 and the dataview suite 108 in greater detail. The extended database 106 comprises a customer table 202, which is segmented into three portions: an identity information portion 204, a personal information portion 206, and a sensitive information portion 208. The identity information portion 206 comprises data columns 220, 232, 244, and 246, which store information that reveals the identity of the consumer. These columns include a consumer account number column 220, name column 232, an address column 244, and a telephone number column 246. The identity portion 204 of the customer table 202 also comprises one or more data control columns 212, which specify data reflecting the privacy preferences, or "opt-outs" for the accompanying data. In the illustrated embodiment, columns 222–230 stores one or more characters ("A" or "D") or flags (represented by "1s" and "0s") which specify privacy preferences for the consumer's data records. In the disclosed embodiment, these privacy preferences include "opt-outs" for (1) direct marketing, (2) disclosure of personal data along with information identifying the consumer, (3) anonymous disclosure of personal data, (4) disclosure of personal data for purposes of making automated decisions, and (5) disclosure or use of sensitive data. The customer table 202 also comprises a global data control column 210. This column can be used to indicate that the consumer wants maximum privacy.

In the exemplary embodiment illustrated, a consumer named Bill K. Jones has permitted some data collection, analysis, or dissemination by selecting a "0" in the global data control column 210. He has further indicated that his consumer information can be used in direct marketing and can be disclosed to third parties, both with his identity, and anonymously. He has allowed the data to be used to perform automated processing, and will permit the dissemination of sensitive data In one embodiment, a TERADATA database management system is utilized to implement the foregoing logical model. This implementation has several advantages.

First, TERADATA's ability to store and handle large amounts of data eases the construction of the many different views and allows the secure data warehousing system 100 to utilize a logical data model in or close to the third normal form.

Second, unlike systems which execute SQL queries as a series of selections to narrow the data down to the dataview subset, the TERADATA database management system rewrites dataview-based queries to generate the SQL that selects the necessary columns directly from the appropriate base tables. While other views materialize entire tables before narrowing down the data to the view subset, TERADATA generates SQL that selectively pulls appropriate columns and rows into the result table. This method is a particularly advantageous in implementing the foregoing logical model.

Third, the foregoing logical model generally results in dataviews, which include complex queries and wide SQL expressions. The TERADATA database management system is particularly effective at optimizing such queries and SQL expressions.

Using the foregoing teaching, alternative logical models having alternatively defined data control column structures can be implemented to meet the particular privacy granularity and control needs of each database application.

Dataviews

A number of dataviews are provided in the dataview suite 108. These dataviews include a standard view 260, a privileged view 262, an anonymizing view 264, and an opt-out view 266. These views limit visibility into the data in the customer table 202 in accordance with the values placed in the data control columns 212.

The standard view 260 will not present personal data unless either the flag in column 224 (indicating that the personal information and identifying information can be disseminated) or 226 (indicating that personal information can only be disseminated anonymously) is activated. Hence, the standard view 260 selectively masks personal data from view unless the consumer has had the appropriate flags set to the proper value.

Scaleable data warehouse (SDW) customer database administrators (DBAs) set up views into customer tables (any tables containing personal information about their customers), such that, for routine users, all columns of personal information are hidden. This allows all routine decision support (DSS) applications and tools with query access to the warehoused data to be precluded from viewing personal information and consequently, all end-users of these applications and tools are also precluded from viewing personal information as well.

To minimize disruption to existing SDW customers, dataviews are established using the same names that are used for base tables in any existing applications that access private data, and corresponding base table names can be renamed to some other value. Thus, whenever an existing application attempts to access private data (now via a dataview), the private data can be screened out by the dataview, depending on user privileges. Using this approach, there is no need to modify existing applications. Instead, the logical data model and database schema would be modified, and additional naming conventions would be introduced.

The privileged view 262 permits viewing, analysis, and alteration of all information. The privileged view 262 will be supplied only to privileged (Class "A") applications 110B, such as those required for administration and/or maintenance of the database (e.g. for inserting new customers, deleting ex-customers, handling address changes), and to those applications which handle privacy related functions (such as informing customers about personal information collected about them, changing/updating personal information, and applying "Opt-in/Opt-out" controls). For example, the client interface module 212, which is used to view, specify, and change consumer privacy preferences, is a privileged application. Appropriate security measures are undertaken to assure that the privileged applications are suitably identified as such, and to prevent privileged view 262 access by any entity that is not so authorized.

Certain SDW applications ("Class B") may perform analysis on personal data, in order to gain insight into customer behavior, e.g. to identify trends or patterns. Such applications may be driven by end-users (knowledge workers or "power analysts") performing "ad hoc" queries, typically using either custom-built software or standard query or OLAP Tools, where the end-user spots the patterns. They may also involve the use of data mining tools, where statistical or machine learning algorithms, in conjunction with the analyst, discover patterns and from them build predictive models.

To derive the greatest value, analytic applications must have access to all available forms of personal information. In order to enable such access, while at the same time respecting personal privacy requirements, special "anonymizing" dataviews are used. These dataviews are designed to provide access to personal data fields, but to screen out all fields containing information that can identify the owner of the data (e.g. name, address, phone number, social security number, account numbers).

The anonymizing view 264 permits the viewing and analysis of personal information, but screens the information stored in the identity information portion 204 from view or analysis unless the flag in the column 224 (permitting disclosure of personal data along with information identifying the consumer) is selected. This data can be provided to analytic applications 110C, which permit data mining and ad-hoc queries. If the consumer permits, this information may also be provided to third party applications 112.

A further class of privileged applications ("Class C") includes applications that use personal information to take some form of action, such as marketing applications (e.g. to create mail or phone solicitations). These marketing applications are subject to the "Opt-in/Opt-out" controls set for each customer, and access customer information through a special dataview that removes or masks all records associated with an activated "Opt-out" indicator. Thus, for example, any customer who has opted out from receiving marketing solicitations would be omitted from any contact list created by the marketing application.

The "Opt out" indicator is a new column added to customer tables, or joined to existing customer tables via dataviews (which is an additional change to the logical data model). In one embodiment, the value of this column for each customer row is initially be set to "Opt Out" (or "Opt in" if permitted by law), and can be modified via the client interface module 122, which handles customer requests regarding privacy controls.

Multiple "Opt Out" indicators may be set up for each customer record. At a minimum, five opt-outs are implemented: for "direct marketing", "third-party disclosure of identifiable data", "third-party disclosure of anonymous data", "automated decisions", and "use of sensitive data". However, a scheme of more fine-grained opt-outs could be designed, based on more detailed customer preferences. For example, "direct marketing" could be broken out into separate opt-outs for contact by telephone, direct mail, and electronic mail, and a catchall for "other" action. This would yield eight separate opt-outs.

Opt-out view 266 permits the use of information for purposes of making automated decisions with action applications 110D, such as those which implement phone or mail solicitation. Views into this information are controlled by the flag in column 228. Alternatively, the value stored in column 228 may comprise a character with sufficient range to permit the single character to not only define that solicitation is permitted, but to indicate what kind and scope of permitted solicitation.

Applications or queries that disclose personal data to third parties (e.g. for marketing or analytic purposes) are subject to both the Class C ("Opt Out") and Class B ("anonymizing") Views. If the customer has opted out of third-party use of their data, then the "Opt Out" dataview applies, and their row (record) is excluded from the output. Other customers may have opted in to third-party disclosure of their data provided it is anonymous; in these cases, the customer data is made anonymous via the "anonymizing" dataview before being output. In all other cases, the customer has opted in to disclosure of their personal data in identifiable form; here the personal data is output along with identifying data columns.

A more fine-grained approach to opting in or out may be implemented. Specific opt-ins or opt-outs could be agreed with each customer for a variety of permissions and protections. For example, disclosure to third parties could be based on specific data fields, relating both to personal characteristics and to personal identifications: a customer might agree to their address and interest profile being provided, but not their financial information and their phone number.

Opt-in/opt-out could also be further extended to gain a more detailed profile of each customer and their interests. For example, each class of opt-out (e.g. the eight opt-outs identified in section 4) could be applied separately to each category of personal data (e.g. demographic data; preference data), or down to each specific data item of personal data (e.g. age, gender; hiking interest, shoe brand preference). In this manner, customers could opt out of certain actions relating to certain interest areas, but could opt in to others (e.g. to receive direct mail marketing for running shoes).

Figure 3A:
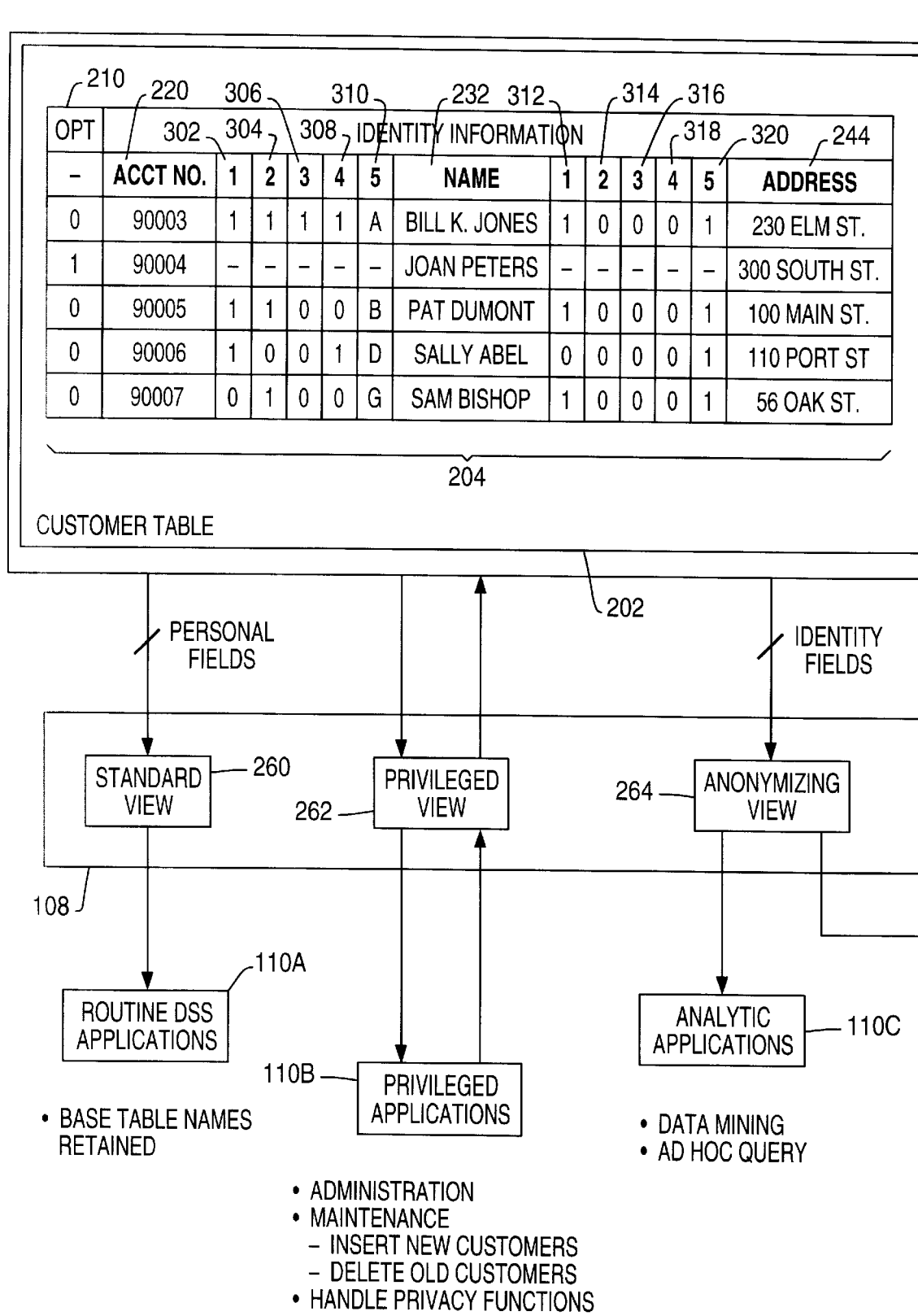
FIG. 3 is a block diagram presenting another illustrative example of the customer tables.
Figure 3B:
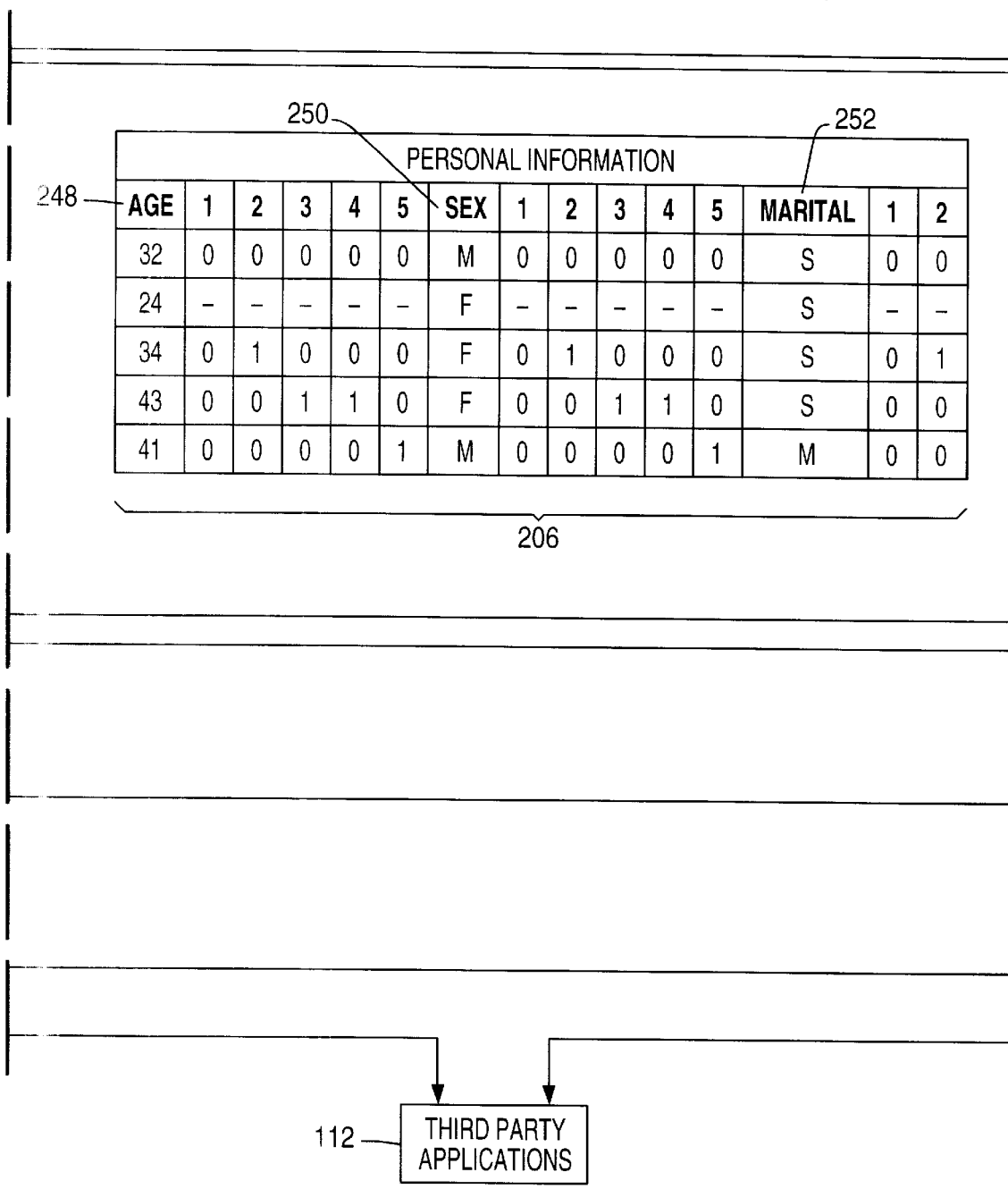
Figure 3C:
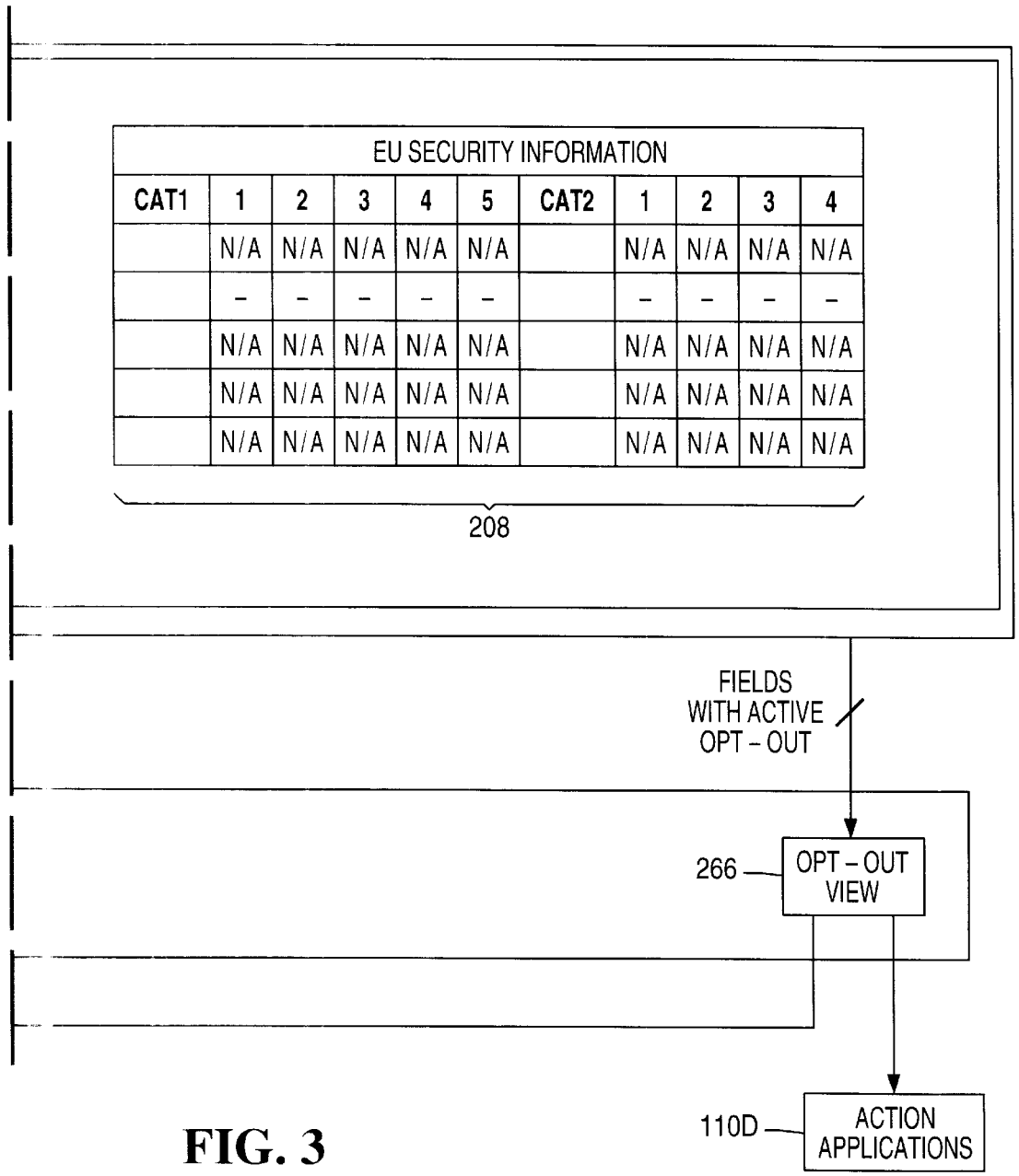
Figure 3:
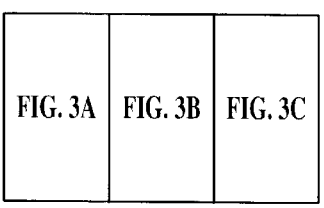

FIG. 3 is a diagram showing an alternative logical model of the secure data warehouse 102 with more fine-grained opt-ins and opt-outs. In this embodiment, each class of privacy preference is applied separately to each category of data (e.g. demographics), or down to each specific data item of personal data (e.g. age, gender, hiking interest, or shoe brand preference). For example, consumer Bill K. Jones may elect to allow his name to be accessible for some purposes, but not others. These limitations can be selected by entering the proper combination of flags for the entries in columns 302–310. Similarly, columns 312–320 can be used to specify the privacy preferences with regard to the storage and/or use of Mr. Jones' name. The preferences defined in columns 312–320 may be different or the same as those described in columns 302–310. The present invention also permits the expansion of the foregoing security preference paradigm to a system of multiple fine-grain preferences, based upon more detailed customer preferences. For example, direct marketing could be broken into separate privacy preferences for contact by telephone, direct mail, electronic mail, and a catchall for "other" action. Further, the scope of the direct marketing could be specified so as to permit only a single contact.

In an alternate embodiment, the security and privacy protection features of the extended database 106 and dataview suite 108 are further enhanced with the use of data encryption. This may be performed by encrypting the data in a given row with an encryption code, or by providing each data field with a unique encryption number. Alternatively, the data may be encrypted at different hierarchical levels of security so as to enforce the privacy preferences of the consumer.

In one embodiment, encryption techniques are used on any identifying field, and selectively applicable on a row basis. This technique allows customers to remain anonymous (e.g. for data mining purposes), but could allow for positive identification for those applications or data requestors that have data encryption rights.

Operation of Dataviews

The dataviews in the dataview suite 108 of the present invention generate SQL statements that selectively pull appropriate columns and rows from the base tables into the result table. Compared to conventional techniques (which materialize entire tables before narrowing the data down to a view subset), this technique reduces the processing required to present the data to the data requestor.

Audit Interface

The owner of the database or an independent auditing service such as BBB ONLINE, TRUSTE, PRICE-WATERHOUSE, TRW, DMA, or CPA WEBTRUST, or NCR may inexpensively run periodic or complaint-driven reviews of the installation. These reviews examine the logical data model and database schema, applications and users that exist for the system, and a TERADATA access log.

The logical data model review examines the dataview structure to confirm the existence of "Standard" Views for Normal users (restricting access to personal information), "Anonymizing" Views for analytic applications, and "Opt Out" Views for other applications.

The applications and user review examines applications and users and the access rights that have been granted to them. This review confirms that "Class A" privileged applications/users have access rights to the "Persona Data" dataview, that "Class B" analytic applications/users have access rights to "anonymizing" dataviews, that "Class C" action-taking applications/users have access rights to "Opt-out" views, that applications that create output tables or files of personal data have access rights to the "Opt Out" and "Anonymizing" Views, and that other applications use the "Standard" View.

Finally, the TERADATA access log or similar log from another database management system is reviewed to assure that the access activity that has occurred complies with the privacy parameters set forth by the data source.

Figure 4:
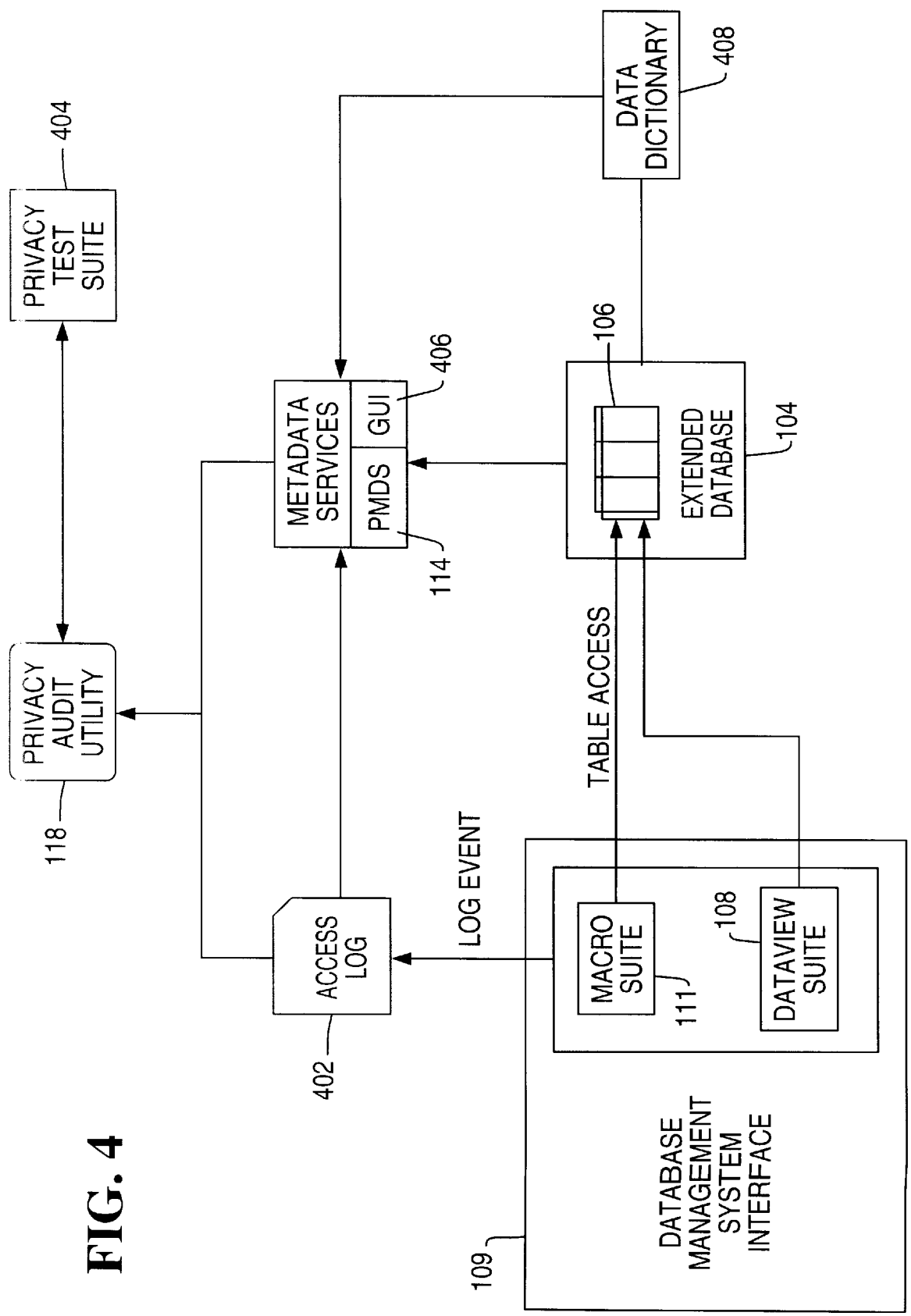
FIG. 4 is a block diagram presenting an overview of the operation of a privacy auditing features of the present invention.

FIG. 4 is a diagram presenting an overview of the operation of a privacy auditing features of the present invention. Whenever a data requesting entity desires access to data in the extended database 106, a request is made to the database management system interface 109 which controls access to the data within the database tables in accordance with privacy parameters. Using a dataview provided from the dataview suite 108 to the requesting entity in accordance with the requesting entity's status as described herein, extended database 106 table is accessed, and the data is provided. At the same time, the database access (or attempted access, if the access is unsuccessful) is logged in an access log 402. Access log 402 includes information regarding the type of access or attempt, the text (SQL) of the request resulting in the access, the frequency of access, the action requested, the name or identification of the requesting entity or application, and the referenced objects (tables, dataviews, and/or macros). The access log 402 permits all accesses to the dataviews in the dataview suite 108, macros in the macro suite 111, or to base tables in the extended database 106 can be audited. All activities granting or revoking access privileges can be audited as well. This is made possible because the access log 402 contents and the table/dataview/macro definitions allow a determination of whether the privacy rules have been enforced or broken.

Privacy audit module 118 is provided to perform a privacy analysis of the data in the access log 402 to validate enforcement of the privacy parameters. The privacy audit module 118 traces all events related to privacy, summarizes activity relating to the access to personal data, and flags any suspected breaches of privacy rules. Privacy test suite 404 comprises programs and other procedures that attempt to "break" the privacy rules, and then examine the access log 402 to determine if privacy rules were enforced or breached. The privacy audit module 118 can be tailored for use by third party auditors who conduct an independent assessment of the enforcement of customer privacy preferences, or by for use by the data warehouse manager.

Metadata Services

Metadata services include a privacy metadata subsystem (PMDS) extension 114. The PMDS extension 114 stores and tracks a number of parameters, and uses these parameters to track activity relating to privacy. Tracked parameters include: (1) data descriptions of all data elements currently in the system (including databases, users, tables, views and macros); (2) data descriptions of internal elements that were source to the system; (3) data descriptions of external elements that were source to the system; (4) data descriptions of internal elements that were target of the system; (5) data descriptions of data elements that were exported from the system; (6) profiles of all users, groups and applications and their access rights to the data; (7) logging of events relating to data access/update, creation of tables/views/macros, granting/revoking of privileges, changes in user profiles, and triggers.

The PMDS extension 114 also stores and manages executable business rules that govern the data controller's adherence to privacy and the logging of events relating to manipulation of the TERADATA logs (e.g. BEGIN/END LOGGING) or similar logs in another DBMS.

The PMDS extension 114 also provides a high-level GUI 406 to for the privacy administrator to review and manage privacy-related metadata. This will include a graphical representation of the databases and their table/view macro structure for all customer (consumer or data subject) information, and of the associated user/user group privileges. The GUI 406 also provides a parameter-driven means of setting up privacy rules and generating consequent dataviews, macros, or access rights, based on definitions provided by the privacy administrator through the GUI 406. The GUI 406 also provides a facility to guide an outside auditor through a review of the site's privacy implementation.

The PMDS extension 114 also provides a reporting facility, which analyzes the contents of the various database and PMDS logs to report on privacy-related activity. The privacy administrator may review such privacy reports via an interactive interface or printed report. Independent auditors, in conjunction with the privacy administrator, may perform their audits with the assistance of such reports.

The PMDS extension 114 also provides a separate GUI application/utility to support consumers in access, review and correction of their personal data and related privacy rules, and may also provide additional logging facilities to provide more details pertaining to privacy related events.

Macros

Either alone or in combination with the dataviews described herein, macros 111 or stored procedures in the database management system interface can be used to control and log accesses to data. Where macros are used to enforce data privacy parameters, users are not given "select" access rights. Instead, users are given the right to access a macro in the macro suite 111 that performs the actual data access and logs the event in the access log 402 for future auditing purposes. Even so, the macros execute against the data through the same views that restrict access to opted-out rows and columns. Such macros are especially appropriate for recording single-row accesses.

Data Dictionary

The data dictionary 408 stores information about the database schema, including all tables, dataviews and macros in the system, all macros in the system, all users and their privileges (including the privileges of users owning macros).

Process

FIG. 5 is a flow chart illustrating exemplary operations used to practice one embodiment of the present invention. The process begins by extending a database table to store and retrieve privacy preferences in one or more columns associated with the data in the table, as shown in block 502. This extended database 106 forms the logical model for storing data (personal and non-personal) and privacy parameters. Typically, the database is initially populated with privacy parameters selecting maximum privacy protection (opting out of all data collection, analysis, and dissemination). Where permitted, the database may be initially populated with privacy parameters selecting lower, even minimum privacy protection.

Privacy parameters can then be accepted from the data source, as shown in block 504. In this context, the data source is typically the ultimate source of the data (that is, the consumer). However, in other embodiments, the data source may be an intermediary third party that that has been provided with the data with instructions on how the data may be used or shared, and which now must assure that the data is used or disseminated in accordance with these instructions.

The operations depicted in block 504 can be accomplished via the client interface module 122, and a client communication device such as a computer running an internet browser 128 (for example, with a browser plug-in), a simple modem 130 with a telephonic connection, by speaking to a service representative (actual or computer-implemented) via a telephone 132, through a kiosk or automatic teller machine (ATM) 134, or other device capable of accepting data source preferences and transmitting them to the client interface module 122. In any of these cases, the data source can view personal data and select privacy parameters consistent with the data source's requirements. Where access is provided through the Internet browser 128, modem 130, kiosk or ATM 134, a privacy wizard implemented in the aforementioned devices can be used to guide the user through the process. The data source may decide to opt-in some of the data collection, analysis, or dissemination activities in exchange for a loyalty program. Once the data source's privacy parameters are obtained, they are stored in the columns associated with the data that is the subject of the privacy parameters. This is depicted in block 506. When a requesting entity requests access to the data, access is provided solely through the database management system interface 109 via the dataview suite 108, the macro suite 111, or both, thus assuring that the data is provided in accordance with the data source's personal privacy parameters.

FIG. 6 is a flow chart illustrating exemplary operations used to provide access through the database management system interface. First, a data request is accepted from a requesting entity, as shown in block 602. Then, a dataview is provided in accordance with verified identity of the requesting entity. The requesting entity can use the dataview to access the database to obtain the data. In one embodiment, dataviews are be provided to the requesting entity in advance, and the requesting entity need only use them to access the data as desired. In another embodiment, the dataviews are provided to requesting entity in response to a data request, and the dataview is tailored according to the data request, the privacy parameters associated with the data, and the identity of the requesting entity.

Figure 7:
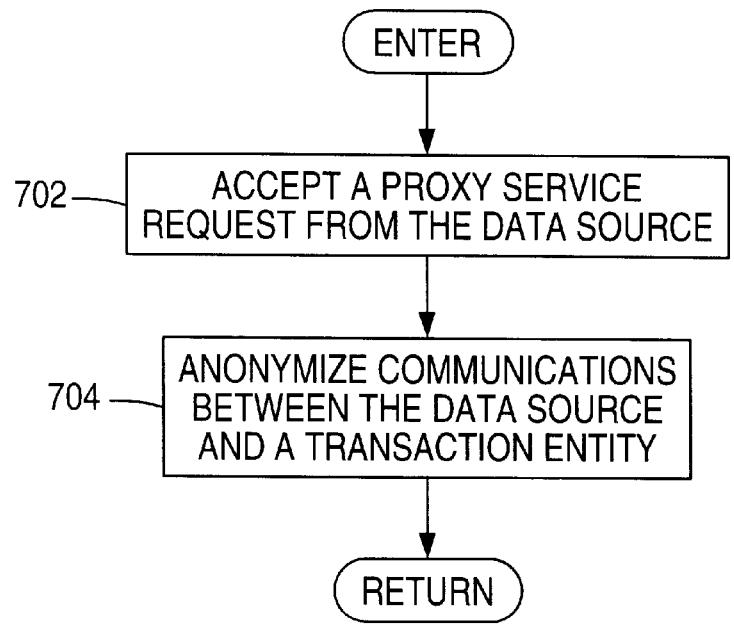
FIG. 7 is a flow chart illustrating exemplary operations used to accept a proxy service request in one embodiment of the present invention.

FIG. 7 is a flow chart illustrating exemplary operations used to accept a proxy service request in one embodiment of the present invention. This embodiment provides the client (or consumer) the ability to conduct an anonymous transaction with a retailer or other entity. This is accomplished with the use of a privacy proxy service, which provides an anonymizing interpreter between the consumer and the retailer (or the database management system). When a proxy service request is received and accepted 702 from the client in the privacy proxy service 150 (and would-be data source), a proxy identification for the client is retrieved. If no proxy identification for the client currently exists, a proxy identification is generated and provided to the client for future use. These transactions may take place through the Internet browser plug in 128, a modem 130, or through a kiosk/ATM 134. Clients may have different anonymizing proxy identifications for each retailer or other entity that may collect personal information. In such cases, a means is provided for assisting the client in managing the proxy identifications. This can be accomplished via data storage and processing on the client's smart card 136, storage on the loyalty card 138, and/or additional processing in the kiosk/ATM or point of sale 134.

Figure 8:
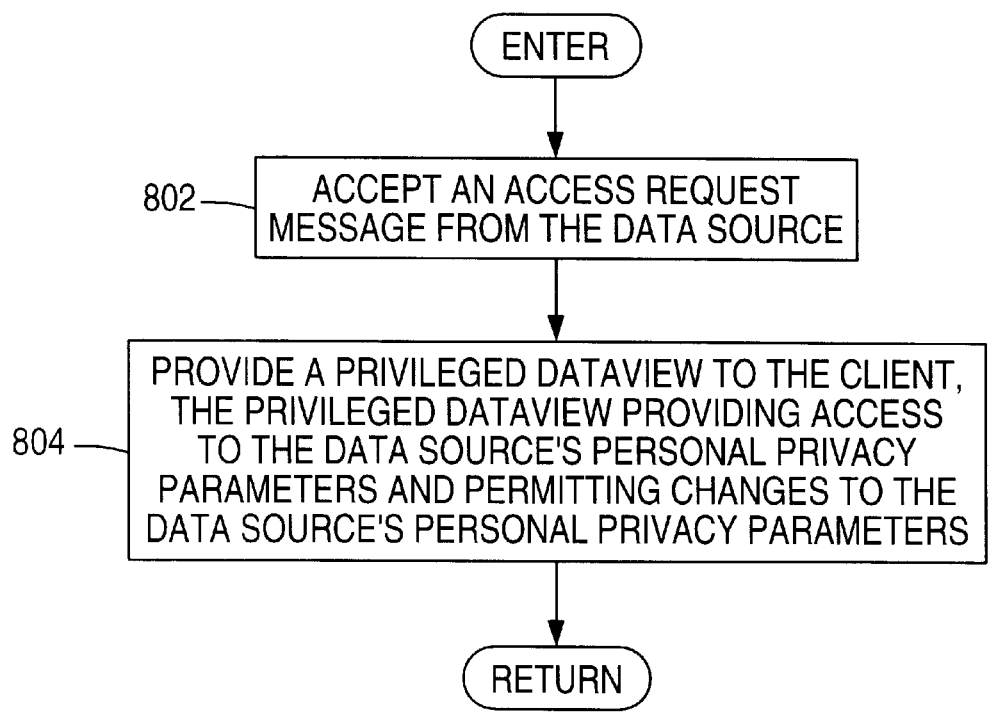
FIG. 8 is a flow chart illustrating exemplary operations used to accept an access request message from a data source.

FIG. 8 is a flow chart illustrating exemplary operations used to accept an access request message from the data source. The present invention also allows the client (or data source) to access and control the collection, storage, and dissemination of personal data via the privileged view 262. First, an access request message is accepted from the client, as shown in block 802. Then, a privileged dataview 262 is provided to the client, as shown in block 804. The privileged dataview 262 provides access to the client's personal privacy parameters, and allows the client to view and change these preferences.

Alternative Embodiments

Figure 9:
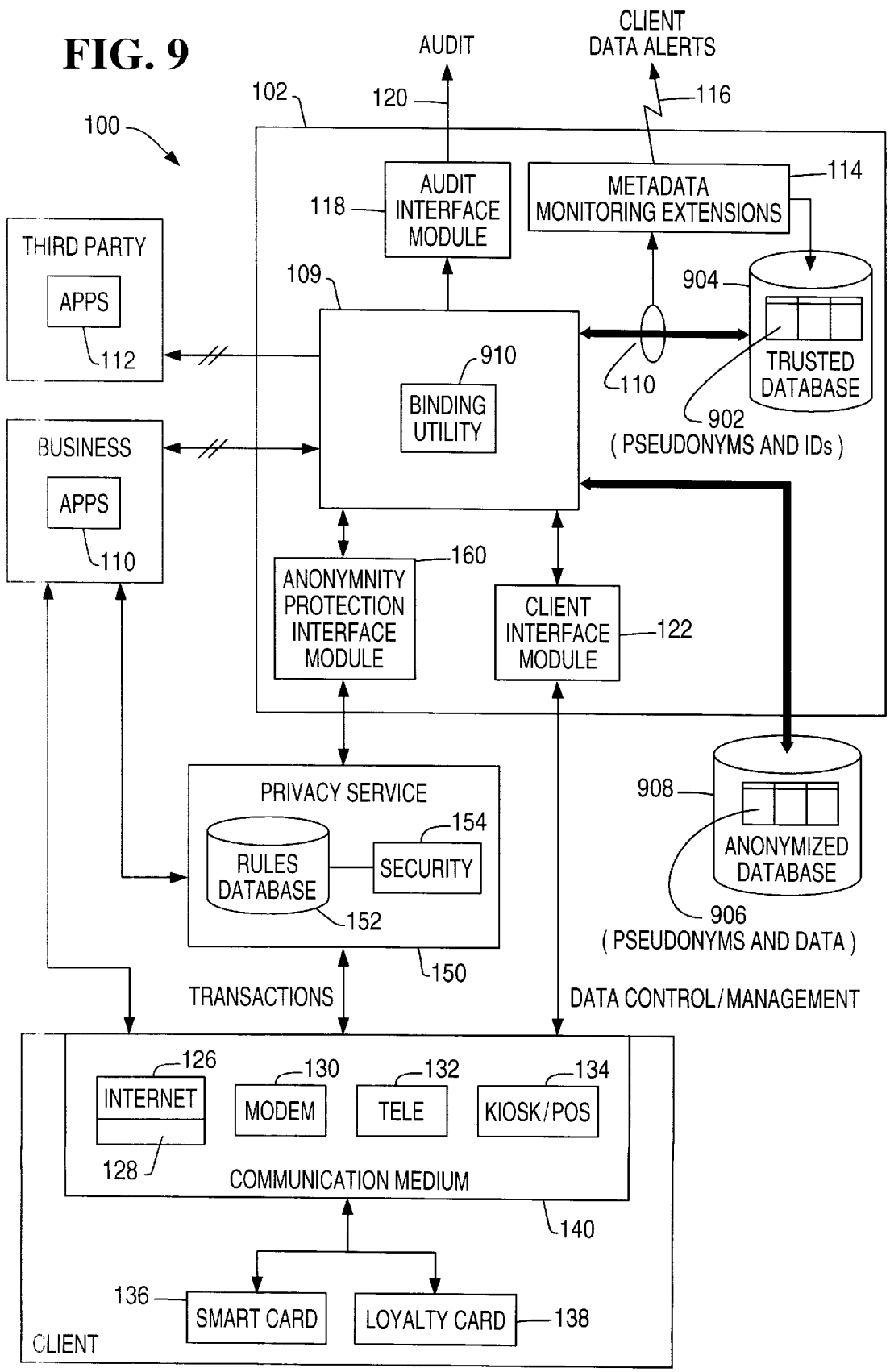
FIG. 9 is a diagram showing an alternative embodiment of the privacy data warehouse with a separately deployed trusted database.

FIG. 9 is a block diagram showing an alternative embodiment of the present invention. In this embodiment, two databases are used. The first is an anonymized database 908, storing anonymized data and pseudonyms associated with the data in tables 906 stored therein. The second database is a trusted database 904, storing tables 902 relating the pseudonyms with customer identification information. In this approach, the customer's name is stored separately in trusted database 904. This database is used by the data management system interface 109 to bind the identity of the customer to the pseudonym, and hence to the data stored in the anonymized database 908. The trusted database also stores the individual's privacy parameters.

Client pseudonyms can be provided to the client by the issuance of a loyalty card 138 or smart card 136, by Internet 126 or on-line communications with a client computer, or by other means. The pseudonym can then be used as a proxy for consumer transactions (thus keeping any data thus collected anonymous). If desired, different pseudonyms can be used for different merchants, or different stores to prevent data mining to ascertain the identity of the customer.

The customer may elect to allow the collection, use, or dissemination of non-anonymous data by selecting data privacy preferences. These preferences are enforced by the data management system interface 109, and are provided by the client using the loyalty card 138, smart card 136, Internet 136, or other communication/data storage method. In one embodiment, an intelligent software agent performs data mining functions to examine customer patterns and to make data privacy parameter suggestions based on the mining results.

In another embodiment, the separate trusted database 904 and anonymized database 908 are used in a multi level security privacy system, where the encryption, macros, dataviews, and/or separate database techniques disclosed herein combined to meet the privacy requirements of different jurisdictions, for different retail outlets, or to accommodate different individual preferences.

Figure 10:
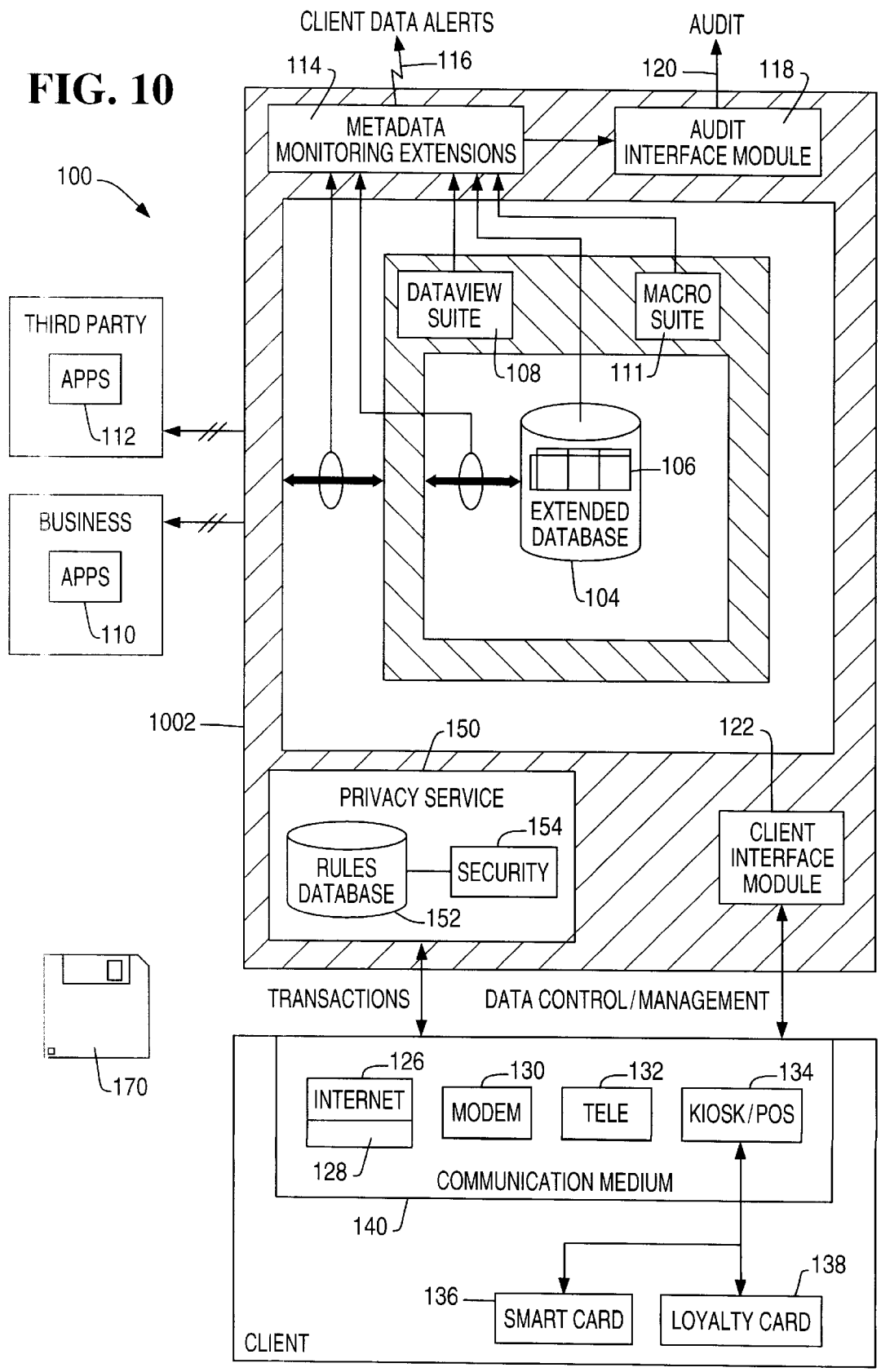
FIG. 10 is a diagram showing an alternative embodiment of the privacy data warehouse with a privacy metadata services interface interposed to manage and log all data access.

FIG. 10 is a diagram showing another alternative embodiment of the privacy data warehouse. As with the other embodiments previously described, access to the data in the database management system 104 is again accomplished via a dataview in the dataview suite 108, or a macro in the macro suite 111. In this embodiment, a privacy metadata services interface 1002 comprising the privacy service 150, the client interface module 122, metadata monitoring extensions 114, and the audit interface 118 is also interposed between all accesses to the database management system 104. The privacy metadata services interface 1002 can therefore log and control all access to the database management system 104, the dataviews in the dataview suite 108, and macros in the macro suite 111.

Figure 11:
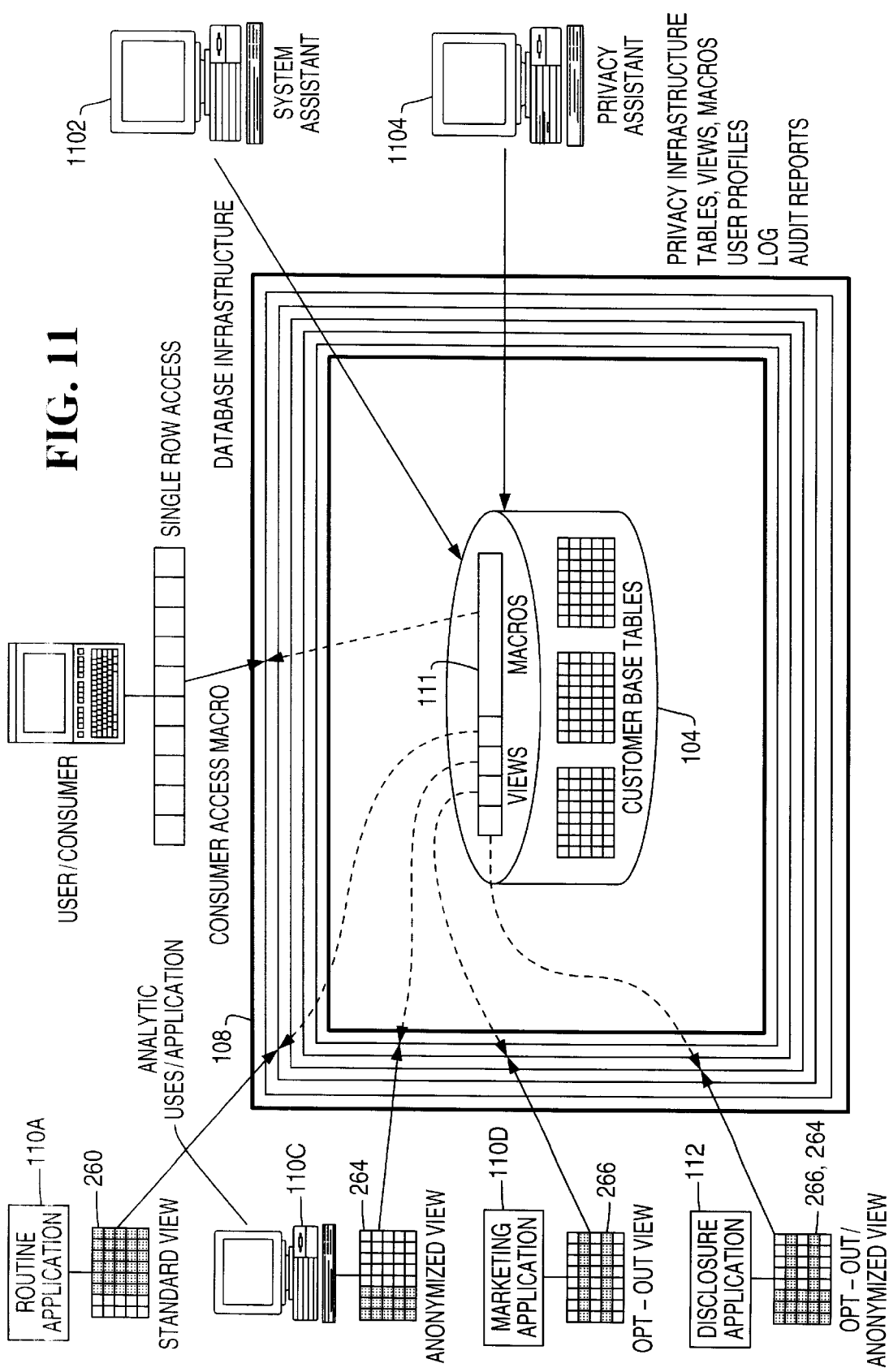
FIG. 11 is a diagram showing an exemplary implementation of dataviews with an interposed privacy metadata services interface.

FIG. 11 is a diagram showing an exemplary implementation of dataviews with an interposed privacy metadata services interface. Visibility and access to the data in the customer base tables in the database management system 104 is provided by dataviews and macros 111. The views into the data are represented by the concentric squares shown in FIG. 11. A consumer access macro or consumer view provides the user/consumer with access to a single row of the customer database table containing data about that consumer or data subject. A system assistant 1102 supports the definition and maintenance of the database infrastructure, while a privacy assistant 1104 supports the definition and maintenance of the tables, dataviews, macros, user profiles, logs, and audit reports. As before, routine applications 110A have access to the customer base tables via a standard view 260, analytic applications 110C have access via an anonymized view in which data that renders the customer identifiable is masked, action (marketing) applications 110D have access via an opt-out view in which entire rows of customer data are omitted, and third party disclosure applications 112 are provided with a dataview which presents only customers who have opted-in, but does not allow access to identifying data. The opt-out/anonymizing dataview can be a separately implemented dataview, or can be implemented applying both the opt-out and anonymizing dataviews.

Conclusion

A method, apparatus, article of manufacture, and a memory structure for managing data privacy in a database management system have been disclosed.

The apparatus comprises a database management system, for storing and retrieving data from a plurality of database tables wherein the data in the database tables is controllably accessible according to privacy parameters stored in the database table, a database management system interface operatively coupled to the database management system and controlling access to the data within the database tables according to the privacy parameters, and an audit module, communicatively coupled to the database management system interface, for validating enforcement of the data privacy parameters in the database management system.

The method comprises the steps of extending a database table to store and retrieve privacy parameters for the data stored in the database table, the privacy parameters collectively stored in a plurality of database columns associated with the data, accepting privacy parameters from the data source, storing the privacy parameters in the columns associated with the data, providing access to the data in the database table to a requesting entity solely through a database management system interface in accordance with the personal privacy parameters, and logging the provided access to the database table in an access log. The program storage device comprises a medium for storing instructions performing the method steps outlined above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A data warehousing, management, and privacy control system, comprising:
    a database management system, for storing and retrieving data from a plurality of database tables storing data in a plurality of rows and columns, the data in the database tables controllably accessible according to privacy parameters stored in the database table;
    a database management system interface operatively coupled to the database management system and controlling access to data within the database tables according to the privacy parameters; and
    a trusted proxy service selectably invokable by a data source to anonymize communications between the data source and an entity with access to the database tables.

2. The system of claim 1, further comprising an audit module, communicatively coupled to the database management system interface, for validating enforcement of the data privacy parameters in the database management system.

3. The system of claim 1, further comprising a data source interface module, operatively coupled to the database management system interface, the data source interface module comprising means for accepting data privacy preference data from a data source and providing the data privacy preference data to the database management system interface.

4. The system of claim 3, wherein the data source interface module further comprises means for obtaining privacy parameters from the database management system and for providing the privacy parameters to the data source.

5. The system of claim 1, further comprising a data source service module for accepting a privacy device selected from the group comprising a loyalty card and a smartcard, the privacy device storing a data source unique identification and communication security information.

6. The system of claim 5, wherein the means for accepting the privacy device further comprises means for issuing a privacy device.

7. The system of claim 1, wherein the database tables are augmented with privacy control columns storing privacy data collectively describing the privacy parameters for the data.

8. The system of claim 7, wherein the database tables are augmented with a privacy control column comprising a field storing privacy parameters applied to the data associated with the field.

9. The system of claim 1, wherein the database management system comprises a dataview suite having a plurality of enforced dataviews through which all data from the database management system is presented.

10. The system of claim 1, wherein the database management system comprises a macro suite for translating data requests into database queries.

11. The system of claim 1, wherein the audit module monitors the temporal integrity of the database management system interface.

* * * * *